United States Patent
Sun et al.

(10) Patent No.: US 9,318,106 B2
(45) Date of Patent: Apr. 19, 2016

(54) JOINT SOUND MODEL GENERATION TECHNIQUES

(71) Applicant: Adobe Systems Incorporated, San Jose, CA (US)

(72) Inventors: Dennis L. Sun, Palo Alto, CA (US); Gautham J. Mysore, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 253 days.

(21) Appl. No.: 13/962,633

(22) Filed: Aug. 8, 2013

(65) Prior Publication Data

US 2015/0046377 A1    Feb. 12, 2015

(51) Int. Cl.
*G06N 99/00*  (2010.01)
*G10L 15/06*  (2013.01)
*G10H 1/00*   (2006.01)
*G10H 1/08*   (2006.01)

(52) U.S. Cl.
CPC ............ *G10L 15/063* (2013.01); *G06N 99/005* (2013.01); *G10H 1/0008* (2013.01); *G10H 1/08* (2013.01); *G10H 2210/056* (2013.01); *G10H 2210/086* (2013.01); *G10H 2240/145* (2013.01); *G10H 2240/305* (2013.01); *G10H 2250/305* (2013.01); *G10H 2250/571* (2013.01); *G10H 2250/641* (2013.01)

(58) Field of Classification Search
CPC .............................. G06N 99/005; G10L 15/20
USPC .......................................................... 706/12
See application file for complete search history.

(56) References Cited

PUBLICATIONS

Grais et al ("Regularized nonnegative matrix factorization using Gaussian mixture priors for supervised single channel source separation" online Sep. 19, 2012).*
Bertin et al "Blind Signal Decompositions for Automatic Transcription of Polyphonic Music: NMF and K-SVD on the Benchmark" 2007.*

* cited by examiner

*Primary Examiner* — Lut Wong
(74) *Attorney, Agent, or Firm* — Wolfe-SBMC

(57) ABSTRACT

Joint sound model generation techniques are described. In one or more implementations, a plurality of models of sound data received from a plurality of different sound scenes are jointly generated. The joint generating includes learning information as part of generating a first said model of sound data from a first one of the sound scenes and sharing the learned information for use in generating a second one of the models of sound data from a second one of the sound scenes.

20 Claims, 7 Drawing Sheets

JOINT SOUND MODEL GENERATION TECHNIQUES

BACKGROUND

Sound decomposition may be leveraged to support a wide range of functionality. For example, sound data, such as that of a movie or of a recording of a song, is often captured in a noisy environment and may include both desirable and undesirable parts. The sound data in a movie, for instance, may include dialog, which is desirable, but may also include the unintended ringing of a cell phone. Thus, it may be desirable to decompose the sound data such that the dialog may be separated from the cell phone.

Conventional techniques that are employed to perform this decomposition typically rely on models learned from actual sound sources. Further, these conventional techniques are typically performed independently and therefore limited by the sound data itself in the generation of the model. Therefore, complications could be encountered in situations in which sound data used to generate the model also contains noise or other artifacts.

SUMMARY

Joint sound model generation techniques are described. In one or more implementations, a plurality of models of sound data received from a plurality of different sound scenes are jointly generated. The joint generation includes learning information as part of generating a first model of sound data from a first one of the sound scenes and sharing the learned information for use in generating a second one of the models of sound data from a second one of the sound scenes.

In one or more implementations, a system includes one or more modules implemented at least partially in hardware and configured to jointly generate a plurality of individual models for respective ones of a plurality of sound data by sharing information during the generating to utilize a penalty that encourages spectral components of the respective models to have similar values. The system also includes at least one module implemented at least partially in hardware and configured to process sound data using at least one of the jointly generated plurality of models.

In one or more implementations, one or more computer readable storage media comprise instructions stored thereon that, responsive to execution by a computing device, causes the computing device to perform operations. The operations include jointly generating a plurality of individual models for respective ones of a plurality of sound data by sharing information during the generation to utilize a penalty that encourages spectral components of the respective said models to have similar values. The operations also include decomposing sound data using at least one of the jointly generated plurality of models.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional sound decomposition techniques typically relied on models formed through observations of sound sources that are to be decomposed from the sound data. However, conventional techniques typically generated these models independently, e.g., to generate separate models for each sound source, and thus could be limited by noise and other artifacts included in sound data used in generating the model.

Model generation techniques are described herein that may leverage knowledge of other models. In one or more implementations, a plurality of audio models (e.g., dictionaries) may be generated for each of a plurality of different sound sources. For example, the models may be generated for different sound sources that have a similar type, such as users, noise, musical instruments, animals, and so on, to learn frequency representations from a plurality of examples of each source.

During this generation, techniques may be employed to leverage knowledge gained as part of the generation of one model with another model, such as to leverage knowledge that the sources are similar. Thus, the generation of the models may be performed jointly by sharing knowledge. For example, generation of a model from sound data that corresponds to one sound source (e.g., a classic piano) may be leveraged in the generation in the model from another similar sound source, e.g., a modern piano. This may be performed in a variety of ways, such as to share basis vectors that describe spectral characteristics as part of the generation of both models. In this way, each of the models may be generated jointly in a manner that may leverage similarity of the sound sources. A variety of other examples are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
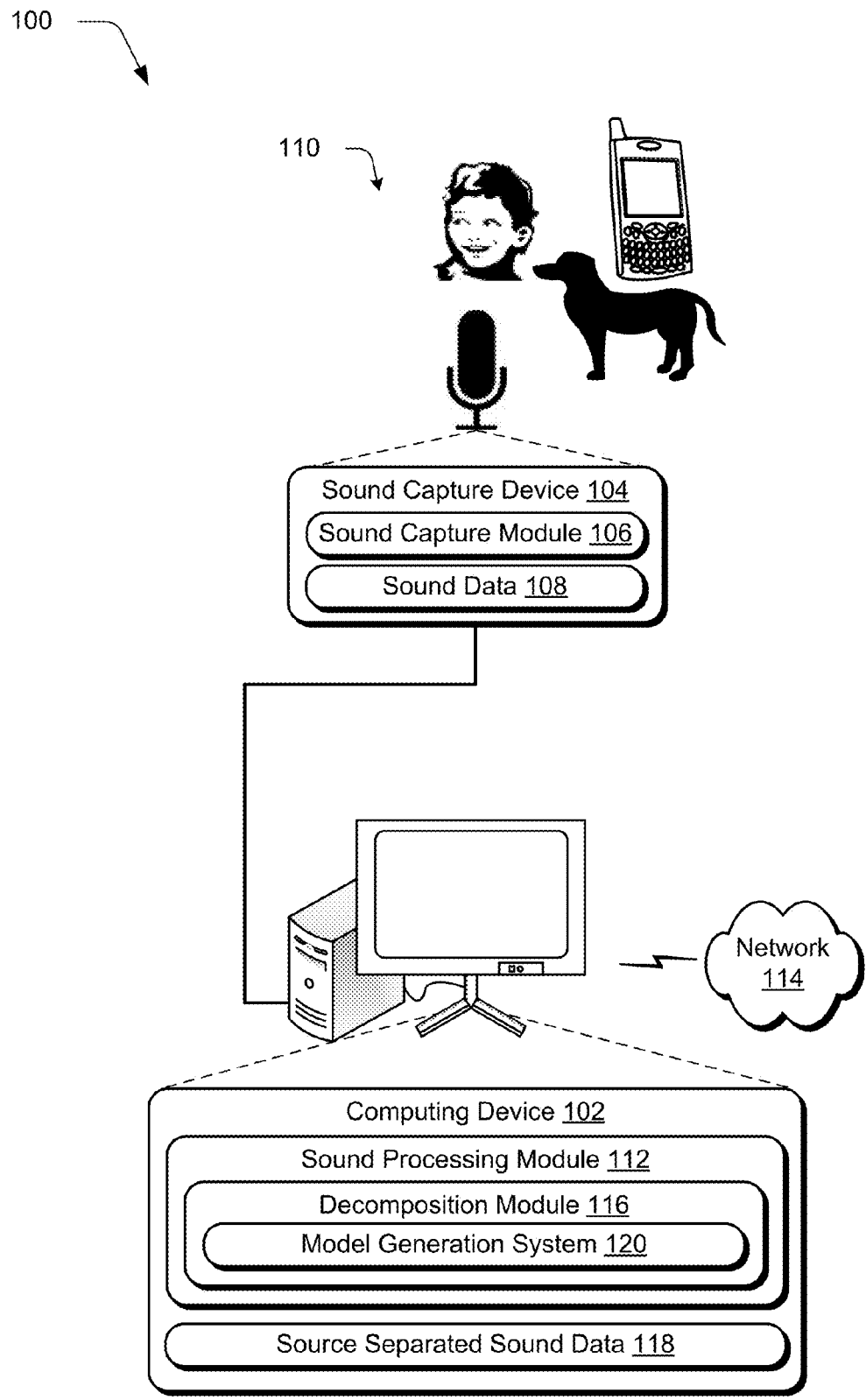
FIG. 1 is an illustration of an environment in an example implementation that is operable to employ sound processing techniques as described herein.

FIG. 1 is an illustration of an environment 100 in an example implementation that is operable to employ sound processing techniques described herein. Although the environment 100 is described that is to be utilized in sound decomposition, other environments are also contemplated that may leverage a model of sound data that corresponds to a sound source. The illustrated environment 100 includes a computing device 102 and sound capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The sound capture device 104 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 may be configured as part of the computing device 102, the sound capture device 104 may be representative of a plurality of sound capture devices, and so on.

The sound capture device 104 is illustrated as including a sound capture module 106 that is representative of functionality to generate sound data 108. The sound capture device 104, for instance, may generate the sound data 108 as a recording of a sound scene 110 having one or more sound sources, which are illustrated as a user, a dog, and a cell phone in FIG. 1. This sound data 108 may then be obtained by the computing device 102 for processing.

The computing device 102 is illustrated as including a sound processing module 112. The sound processing module 112 is representative of functionality to process the sound data 108. Although illustrated as part of the computing device 102, functionality represented by the sound processing module 112 may be further divided, such as to be performed "over the cloud" by one or more servers that are accessible via a network 114 connection, further discussion of which may be found in relation to FIG. 7.

An example of functionality of the sound processing module 112 is represented as a decomposition module 116. The decomposition module 116 is representative of functionality to decompose the sound data 108 according to a likely source of respective parts of the sound data 108. As illustrated in the audio scene 110 of FIG. 1, for instance, the decomposition module 116 may be used to separate the sound data 108 according to different sources, such as to separate dialog from the person in the sound scene 110 from ringing of a cell phone and barking of the dog to form source separated sound data 118. This may be used to support a variety of different functionality, such as audio denoising, music transcription, music remixing, audio-based forensics, source replacement, and so on.

To perform this decomposition, the decomposition module 116 may employ a variety of different functionality. One example of this functionality is illustrated as a model generation system 120. The model generation system 120 is representative of functionality to generate models of respective sound sources, such as users, noise, musical instruments, and so on. Further discussion of functionality of the model generation system 120 may be found in the following description of FIG. 2.

Figure 2:
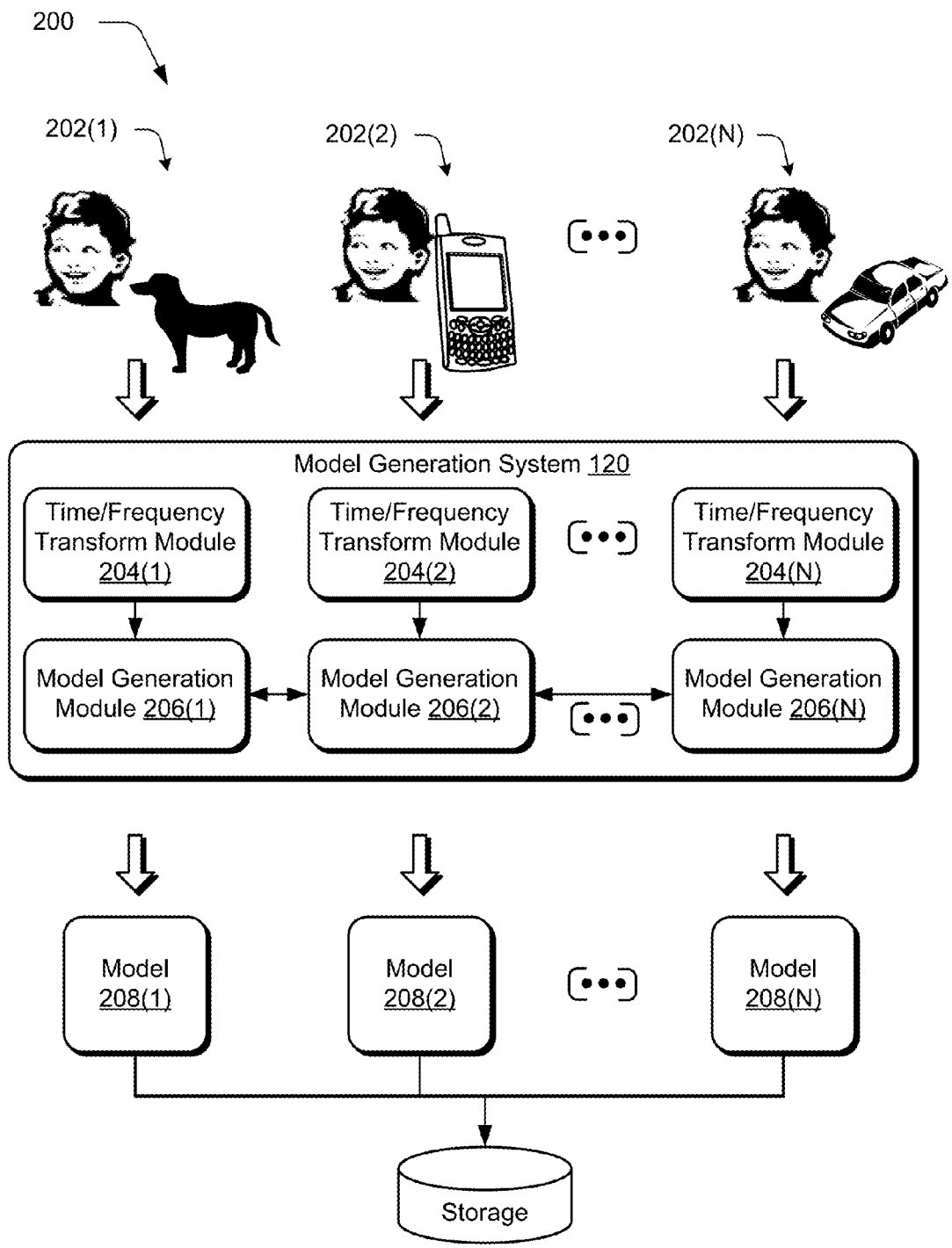
FIG. 2 depicts a system in an example implementation in which a model generation system is illustrated in greater detail.

FIG. 2 depicts a system 200 in an example implementation in which the model generation system 120 is illustrated in greater detail. In this example, sound data is received by the model generation system 120 from a variety of different sound scenes 202(1), 202(2), . . . , 202(N). Each of the sound scenes 202(1), 202(2), 202(N) are similar in this instance in that at least one sound source is common to the scenes, e.g., speech of a particular person in this example. A variety of other examples of similarity are also contemplated, such as similarity of type of sound source, which may include speech, musical instrument, type of noise such as a dog barking, cellphone ringing, traffic noise, and other examples.

Sound data received from these scenes is then processed by the model generation system 120. The model generation system 120, for instance, may employ one or more techniques to generate a representation of the sound data for each of the sound sources. In the illustrated example, the model generation system 120 employs a respective time/frequency transform module 204(1), 204(2), . . . , 204(N) to generate a time/frequency representation of sound data from a respective one of the plurality of sound scenes 202(1)-202(N).

The time/frequency representations, for instance, may be used to quantify the sound data such that a plurality of different time/frequency bins are used to represent sound data at respective time/frequency combinations, e.g., time "x" and frequency "y." Although a respective time/frequency transform module is illustrated for each sound source, a variety of other examples are also contemplated, including use of a single time/frequency transform module or any other number of module.

For example, the time/frequency transform modules 204 (1)-204(N) may be utilized to form one or more spectrograms of a respective sound signal. A time-domain signal, for instance, may be received and processed to produce a time-frequency representation. Spectrograms may be generated in a variety of ways, an example of which includes calculation as magnitudes of short time Fourier transforms (STFT) of the signals and so forth. Additionally, the spectrograms may assume a variety of configurations, such as narrowband spectrograms although other instances are also contemplated. Other representations are also contemplated, such as a time domain representation, an original time domain signal, and so on.

The model generation system 120 may then leverage a plurality of model generation modules 206(1), 206(2), . . . , 206(N) which may be used to generate a model 208(1), 208 (2), . . . , 208(N) for a respective one of the plurality of sound sources. During this generation, knowledge learned as part of the generation process may be shared to support joint learning of the different models, which is illustrated through use of arrows that are shown connecting the modules.

For example, the models 208(1)-208(N) may be generated by respective model generation modules 206(1)-206(N) through creation of a dictionary of spectral components that represent general characteristics of sound data of a respective sound scene 202(1)-202(N), which may be generalized to other unseen instances of the source. The model generation modules 206(1)-206(N) may also estimate weights, which represent characteristics of the specific instance of the excerpt of data.

Dictionary learning refers to a process of approximately factoring a matrix "X" into "W" and "H." It is so named because if the observations "$x_i$" are stacked side-by-side into a matrix "X=[$x_i$ ... $x_n$]," then dictionary learning is used to find a set of basis vectors "$w_i$" (i.e., a "dictionary") from which the observations may be generated as follows:

$$x_i \approx \Sigma_k h_{ki} w_i$$

In an audio context, dictionary learning may be applied to a time/frequency representation as described above to learn the latent spectral features "$w_k$" and corresponding activations over time. A variety of different techniques may be utilized to factor a matrix "X" into factors "W" and "H," which include singular value decomposition (SVD), non-negative matrix factorization, and so on.

Non-negative matrix factorization may be configured for use in sound processing because sound spectrograms (also referred to as simply spectrograms in the following discussion) are effectively low rank non-negative matrices. Therefore, these spectrograms may be used to compactly represent sound data in a semantically meaningful way. A typical audio spectrogram may be described using a few spectral patterns and these spectral patterns may be interpreted as a dictionary of spectral components.

Figure 3:
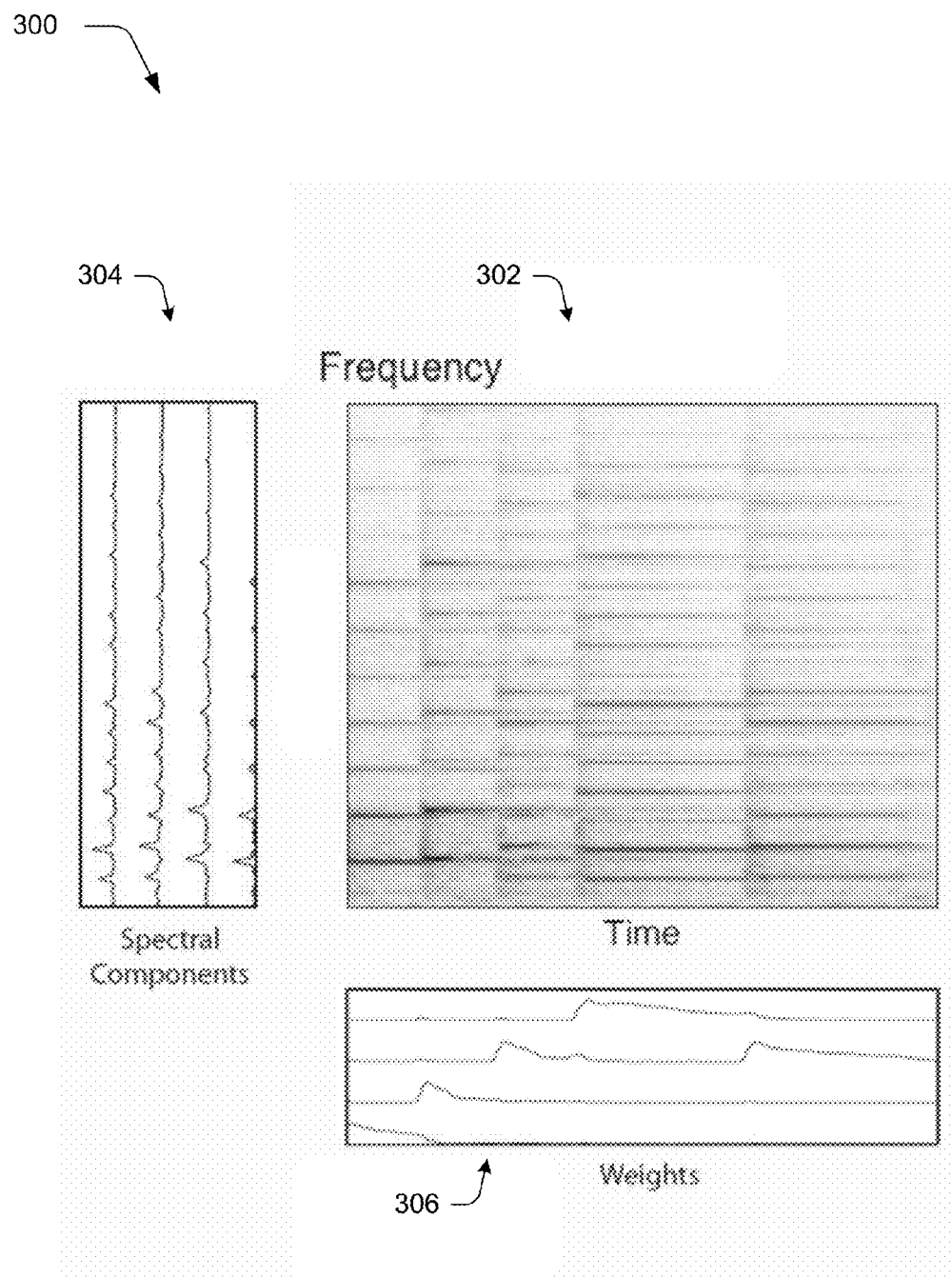
FIG. 3 depicts an example of spectrograms.

As shown in the example 300 of FIG. 3, for instance, non-negative matrix factorization may be applied to a spectrogram 302 of a sound clip of piano music. The sound clip has five notes as can be seen in the spectrogram 302. The fifth note is a repetition of the third note so there are four distinct notes. When NMF is applied to the spectrogram 302 (with K=4), four distinct spectral components 304 are learned. Additionally, the weights 306 of these spectral components at each time frame are learned. The attack and decay of each note can be seen in the weights. Additionally, the repetition of the third note can also be seen in the weights.

Each time frame of a spectrogram can thus be explained by a linear combination of these spectral components. A typical model is as follows:

$$v_t \approx \sum_{k=1}^{K} h_{kt} w_k,$$

where "$v_t$" is the "t-th" frame of the spectrogram. The spectrogram is explained by "K" spectral components. The component "$w_k$" is the "k-th" component and "$h_{kt}$" is the weight of the "k-th" component at time "t." In matrix notation, this relationship may be represented as:

$$V \approx WH,$$

where the spectrogram "V" is a "F×T" matrix. The dictionary "W" is a "F×K" matrix in which each column is a spectral component. The mixture weights may be expressed in a "K×T" matrix "H" in which each row represents the weights for a given component.

Given "V," the estimation of "W" and "H" with the constraint that both matrices are non-negative, expresses the non-negative matrix factorization (NMF) problem. This is useful for discovering structure in spectrograms as shown in the example 300 of FIG. 3.

Non-negativity may play a role in this factorization to discover spectral components that characterize the spectrogram. Since a spectrogram is by definition non-negative, semantically meaningful spectral components are also non-negative. As the spectrogram is modeled as a weighted sum of spectral components, the estimated components may have negative values without an explicit non-negativity constraint. This may be observed in algorithms such as principle component analysis (PCA). Given a spectrogram, the model that is learned is therefore the dictionary of spectral components. This dictionary may be used for representing the general characteristics of the sound source and can be generalized to other unseen instances of the source. The weights, on the other hand, characterize the specific instance of data at hand.

In the example system 200 of FIG. 2, the model generation modules 206(1)-206(N) utilize multitask learning techniques that are configured to generate the models 208(1)-208(N) jointly from sound data from a plurality of different sound scenes 202(1)-202(N). For instance, the model generation modules 206(1)-206(N) may leverage sound data from one source to improve an estimate of another source. Further, this may be performed for sound data from similar sound sources as described above, e.g., a same user, different types, and so on. Accordingly, "knowledge" gained by the respective model generations modules 206(1)-206(N) may be leveraged by sharing this knowledge to jointly generate the respective models 208(1)-208(N) for sound sources having similarities as described above.

For example, an objective function which is described as follows may be solved:

$$\underset{W^{(i)}, H^{(i)} \geq 0}{\text{minimize}} \sum_i D(X^{(i)} \| W^{(i)} H^{(i)}) + \sum_{i,j} \sum_k \lambda_k D(W_k^{(i)} \| W_k^{(j)})$$

where "D" is a measure of divergence between the matrices. This problem may be solved using multiplicative updates with an efficient Newton-Raphson inner loop whose complexity is linear in the number of shared basis vectors. Other techniques to find approximations (e.g., successively better approximations) for the roots of a real-valued function are also contemplated.

The models 208(1)-208(N) may be utilized as part of a variety of different sound processing techniques. For example, sound decomposition techniques using NMF-based approaches as described above may employ training data (e.g., a model) as part of the process. Accordingly, "cleanliness" of the model may be desirable. Thus, a model learned from multiple sound sources, jointly, as in the present techniques may be able to recover clean sources from several noisy recording.

In another example, multitask dictionary learning may also be utilized to learn a correspondence between the models (e.g., dictionaries) for the different sources. Thus, techniques may leverage this correspondence to swap out the basis vectors of one source for those of another, e.g., such as to allow one singer's voice to be morphed into another, to restore the instruments in an old recording to modern quality, and so on. An example of sound decomposition is described in relation to the following figure.

Figure 4:
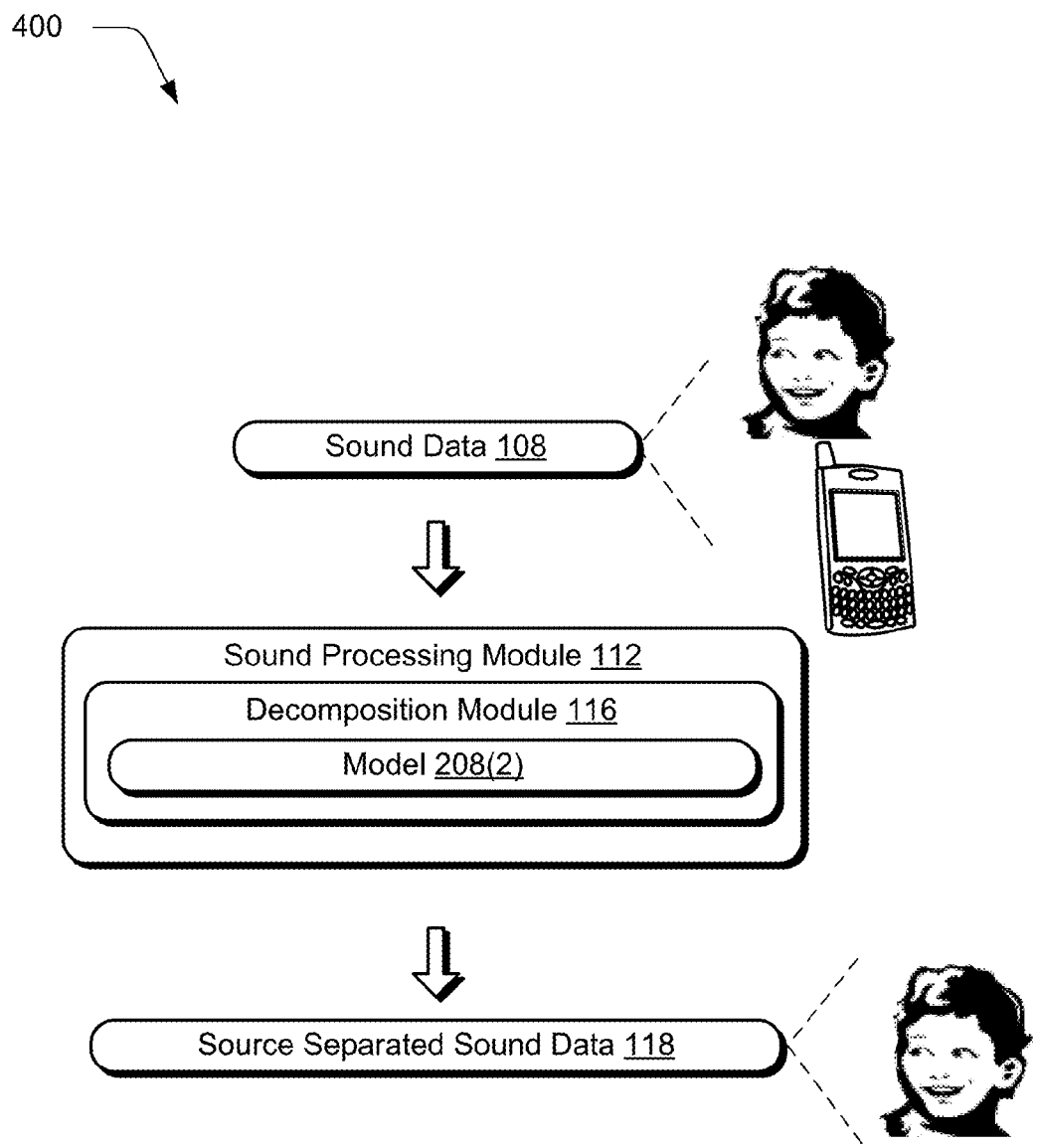
FIG. 4 depicts a system in an example implementation in which sound data is decomposed through use of a model as generated in relation to FIG. 2.

FIG. 4 depicts a system 400 in an example implementation in which sound data 108 is decomposed through use of a model as generated in relation to FIG. 2. In applications such as audio denoising, music transcription, music remixing, and audio-based forensics, for example, a recording having sound data 108 may be decomposed into its respective sources. One technique to perform such decomposition is based on nonnegative matrix factorization and related latent variable models although other examples are also contemplated as described above.

Sound data 108, for instance, may be received by a sound processing module 112. As previously described, the sound data 108 may originate from a variety of different sources, such as speech from a user, barking of a dog, a ring of a cell phone, and so on. In the illustrated example, the sound data 108 includes sound that includes speech of a user and the ringing of a cellphone.

The sound data 108 is then processed by a decomposition module 116 of the sound processing module 112. The decomposition module 116 may include functionality to identify components in the sound data 108, such as the spectral components described above. This may include an estimation of a likely contribution of each source to portions of the sound data 108 based at least in part on the model 208(2). In this way, the model 208(2) may be used to guide the sound decomposition process. The decomposition module 116 may then use this identified contribution to separate the sound data 108 based on labeling resulting from the analysis to generate the source separated sound data 118.

In an implementation example, speech captured in a noisy environment is sampled. This includes capturing first and second recordings, each of which include speech from a female speaker, although different sentences were spoken. The speech in the first recording is mixed with a siren and the speech in the second recording is mixed with the dialing of a telephone.

Figure 5:
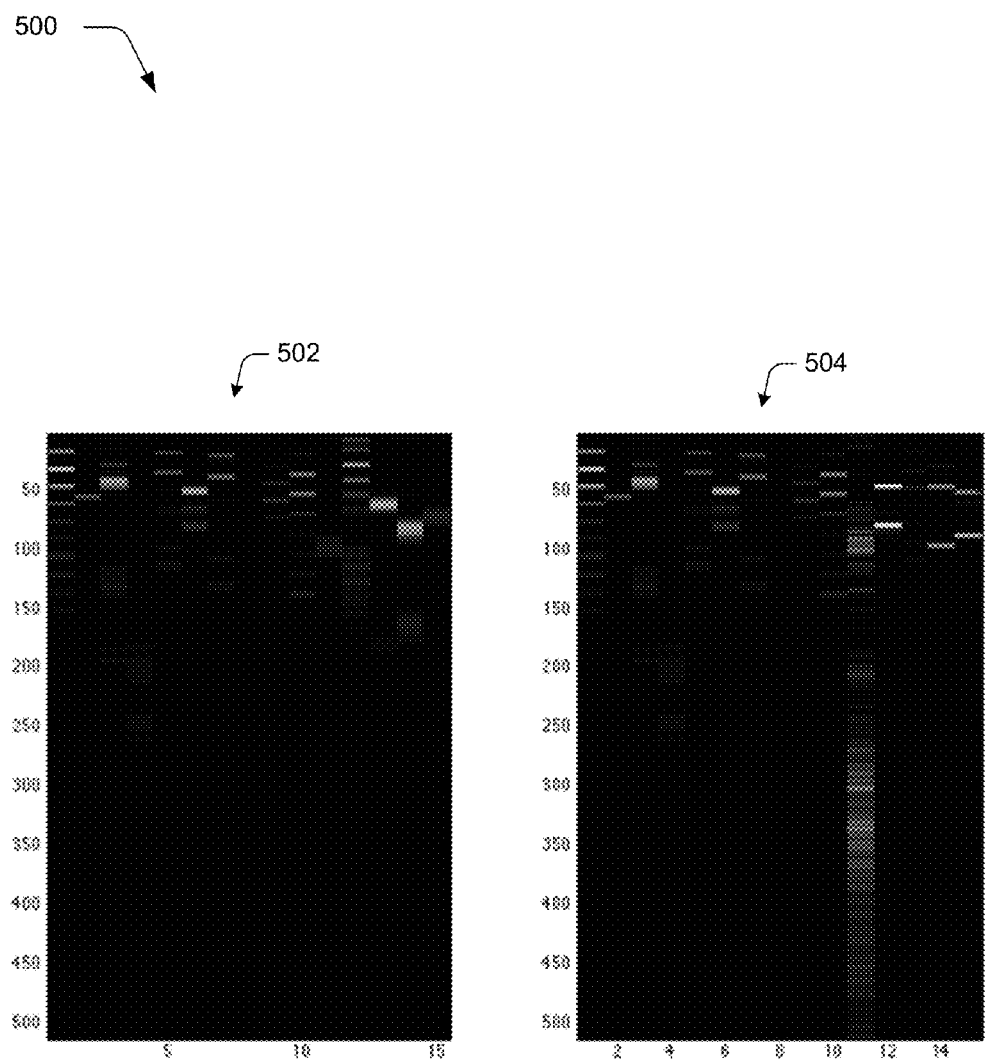
FIG. 5 depicts an example of learned basis vectors.

Since the speaker is the same in the two recordings, the value of "$\lambda_k$" was chosen to be relatively large to constrain the shared speech basis vectors to be the same. The learned basis vectors are shown in the example of FIG. 5, showing a siren 502 and the dialing of the telephone 504. As illustrated, the techniques have identified pulse tones of the telephone (as well as some noise that was in the background of that recording) in the second mixture without use of training data whatsoever. Rather, the techniques instead leveraged the knowledge that the second recording is to share at least some basis vectors with the first recording.

The following table shows the separation quality in dB, confirming the advantages provided by multitask dictionary learning

|  | SDR | SIR | SAR |
|---|---|---|---|
| Speech 1 | 1.9 | 4.5 | 6.6 |
| Speech 2 | 5.0 | 10.2 | 7.0 |

Thus, the multitask dictionary learning techniques described herein have achieved about 2 dB and 5 dB of speech enhancement without use of training data of either source in this example. A variety of other examples are also contemplated without departing from the spirit and scope thereof.

Example Procedures

The following discussion describes joint sound model generation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
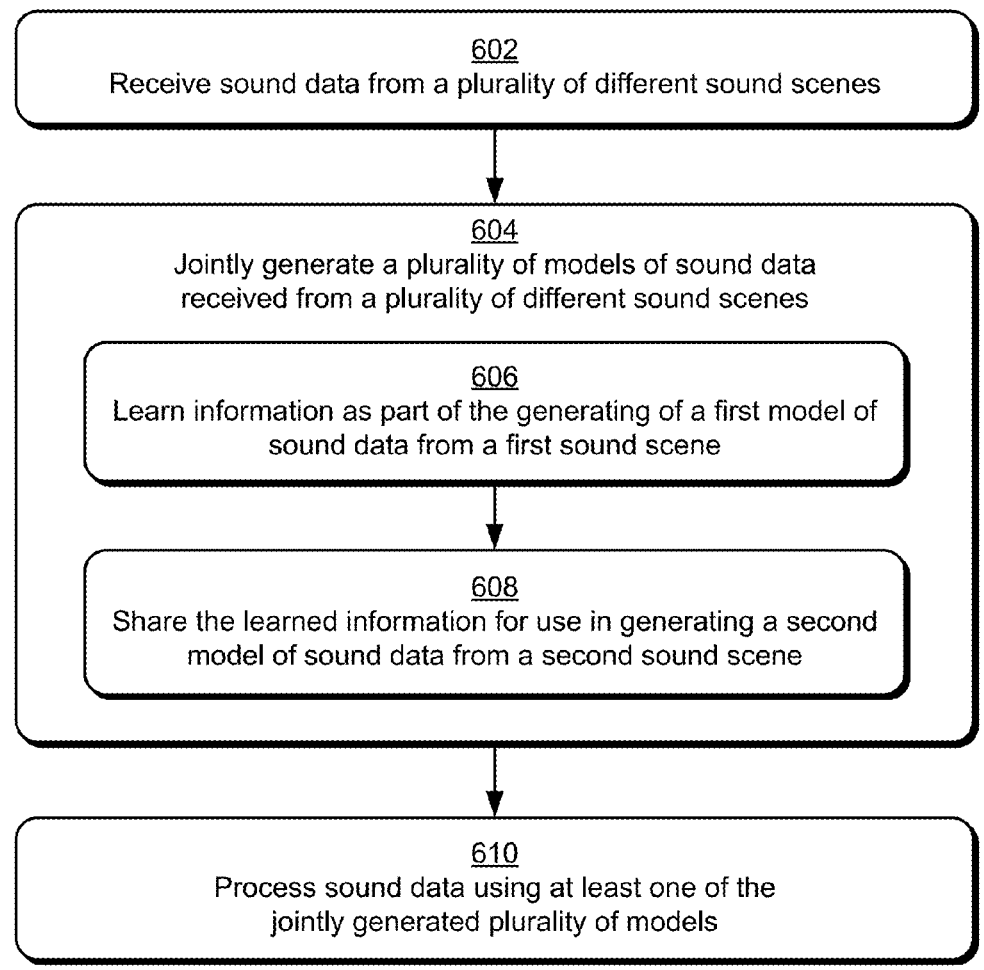
FIG. 6 is a flow diagram depicting a procedure in an example implementation in which a joint sound generation technique is described.

FIG. 6 depicts a procedure 600 in an example implementation in which a model is generated from sound data jointly in conjunction with the generation of at least one other model. Sound data is received from a plurality of different audio scenes (block 602). As shown in FIG. 2, for instance, sound data may be received from a plurality of different sound scenes, each of which may include one or more sound sources. In the example of FIG. 2, sound data from each of the sound scenes is similar in that it includes sound data from a sound source that is common to each of the sound scenes. Other examples are also contemplated, such as similarity based on type and so on as well as examples not involving similarity.

A plurality of models of sound data are jointly generated from the plurality of different sound scenes (block 604). A variety of different techniques may be employed to perform this joint generation. For example, information may be learned as part of the generating of a first model of sound data form a first sound scene (block 606), which may include basis vectors or other information as described above.

The learned information is shared for use in generating a second model of sound data from a second sound scene (block 608). For example, the shared information may be utilized as part of a penalty that encourages spectral components of the respective models to have similar values. Continuing with the previous example, in such a case of similarity of the sound data, this sharing may be utilized to address sound data that is noisy, has missing parts, and so on.

The sound data is then processed using at least one of the jointly generated plurality of models (block 610). A variety of different techniques may be employed that utilize a model of sound data, such as sound decomposition as described above. A variety of other examples are also contemplated.

Example System and Device

Figure 7:
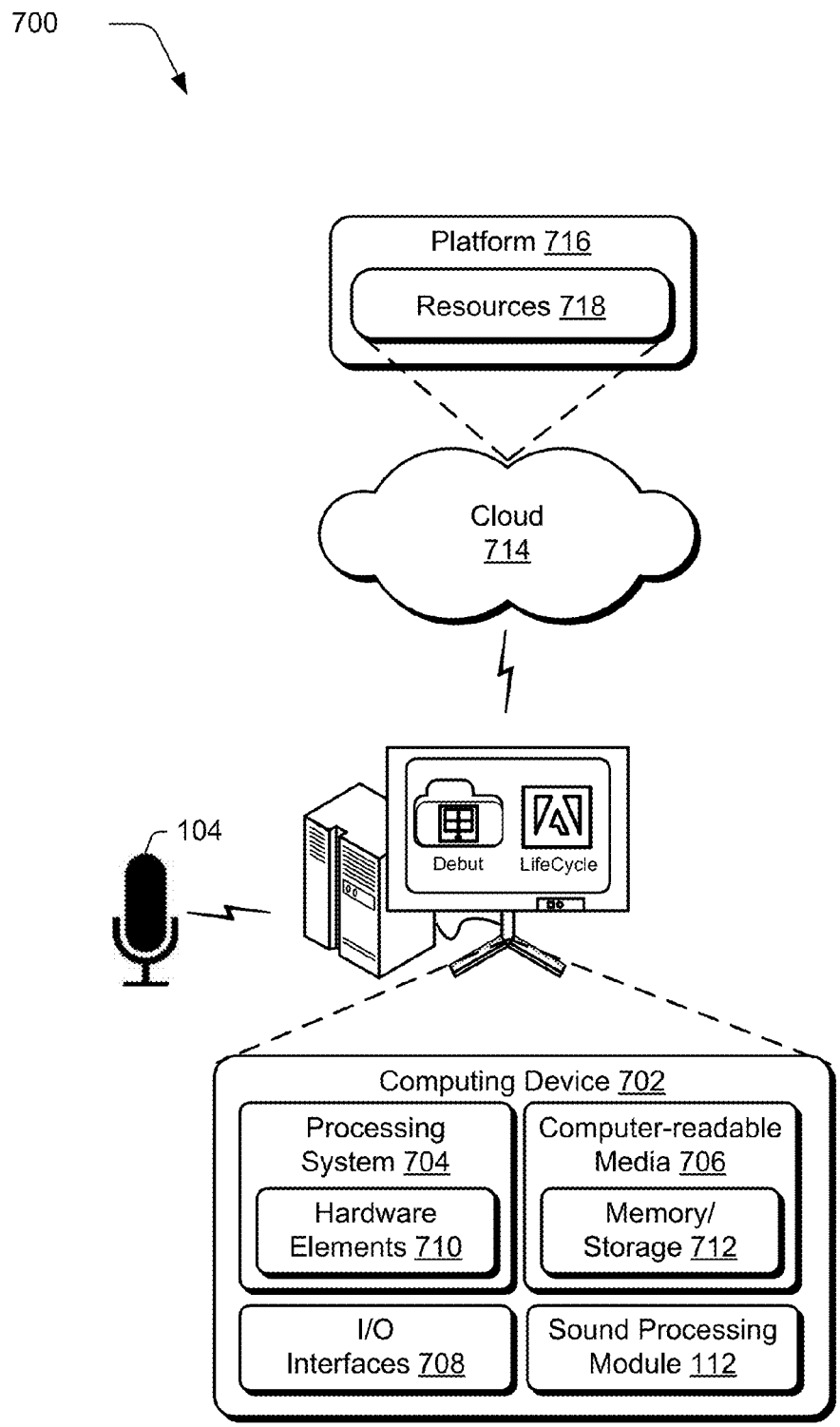
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the sound processing module 112, which may be configured to process sound data. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
    obtaining sound data from a plurality of different recordings that correspond to a plurality of different sound scenes;
    jointly generating a plurality of models of sound data, each of the models serving as a dictionary that represents characteristics of a sound source included in at least one of the plurality of different sound scenes, and the joint generating including:
        learning information as part of generating a first said model of sound data from a first said recording of a first said sound scene; and
        sharing the learned information to generate a second said model of sound data from a second said recording of a second said sound scene; and
    decomposing sound data using at least one of the jointly generated plurality of models and without using training data.

2. A method as described in claim 1, wherein the information includes basis vectors.

3. A method as described in claim 1, wherein the sound data is similar in that each of the plurality of sound scenes includes at least a common sound source.

4. A method as described in claim 1, wherein the sound data is similar in that each of the plurality of sound scenes includes a common type of sound source.

5. A method as described in claim 4, wherein the types of sound source include speech, musical instrument, or type of noise.

6. A method as described in claim 1, wherein each of the models is generated based on non-negative matrix factorization (NMF) or latent component analysis.

7. A method as described in claim 1, further comprising generating the second said model using the shared learned information as a basis to form a penalty term that encourages the first and second said models to include relatively close values for spectral components of the models.

8. A method as described in claim 1, further comprising
    learning corres ondences between the models of sound data using multitask dictionary learning; and
    swapping basis vectors of a first sound source with basis vectors of a second sound source based on the learned correspondences to impart the characteristics of the second sound source on the first sound source.

9. A method as described in claim 1, wherein the decomposing is performed according to one or more sound decomposition techniques.

10. A method as described in claim 1, wherein the decomposing is performed to support audio denoising, music transcription music remixing, or audio-based forensics.

11. A system comprising:
    one or more modules implemented at least partially in hardware and configured to jointly generate a plurality of individual models for respective ones of a plurality of sound data by sharing information during the generating to utilize a penalty that encourages spectral components of the respective said models to have similar values, an individual model serving as a dictionary that represents characteristics of a sound source included in at least one of a plurality of sound scenes that correspond to the plurality of sound data; and
    at least one module implemented at least partially in hardware and configured to decompose sound data using at least one of the jointly generated plurality of models and without using training data.

12. A system as described in claim 11, wherein the shared information includes basis vectors.

13. A system as described in claim 11, wherein the sound data is similar in that each of the plurality of sound scenes includes at least a common sound source or includes a common type of sound.

14. A system as described in claim 11, wherein the at least one module is configured to decompose the sound data using one or more sound decomposition techniques.

15. One or more computer readable storage media comprising instructions stored thereon that, responsive to execution by a computing device, causes the computing device to perform operations comprising:
    jointly generating a plurality of individual models for respective ones of a plurality of sound data by sharing information learned during the generating from a plurality of recordings that correspond the plurality of sound data, the information shared to utilize a penalty that encourages spectral components of the respective said models to have similar values; and
    decomposing sound data using at least one of the jointly generated plurality of models and without using training data.

16. One or more computer readable storage media as described in claim 15, wherein the shared information includes basis vectors.

17. One or more computer readable storage media as described in claim 15, wherein the sound data is similar in that each of the plurality of sound scenes includes at least a common sound source.

18. One or more computer readable storage media as described in claim 15, wherein the sound data is similar in that each of a plurality of sound scenes that correspond to the plurality of recordings, respectively, includes a common type of sound.

19. One or more computer readable storage media as described in claim 15, wherein each of the models is generated based on non-negative matrix factorization (NMF) or latent component analysis.

20. One or more computer readable storage media as described in claim 15, wherein each of the models is generated based on singular value decomposition (SVD).

* * * * *

UNITED STATES PATENT AND TRADEMARK OFFICE
CERTIFICATE OF CORRECTION

Page 1 of 1

PATENT NO. : 9,318,106 B2
APPLICATION NO. : 13/962633
DATED : April 19, 2016
INVENTOR(S) : Sun et al.

It is certified that error appears in the above-identified patent and that said Letters Patent is hereby corrected as shown below:

In the Claims

Column 11, line 61, delete "corres ondences between the models" insert -- correspondences between the plurality of models --, therefor.

Signed and Sealed this
Seventh Day of June, 2016

Michelle K. Lee
*Director of the United States Patent and Trademark Office*